UNITED STATES PATENT OFFICE.

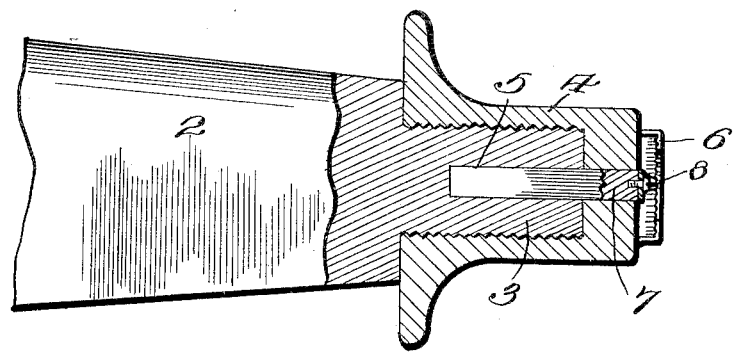
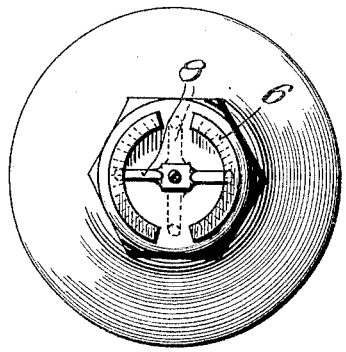
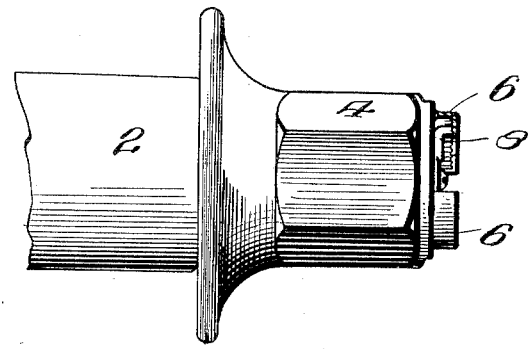
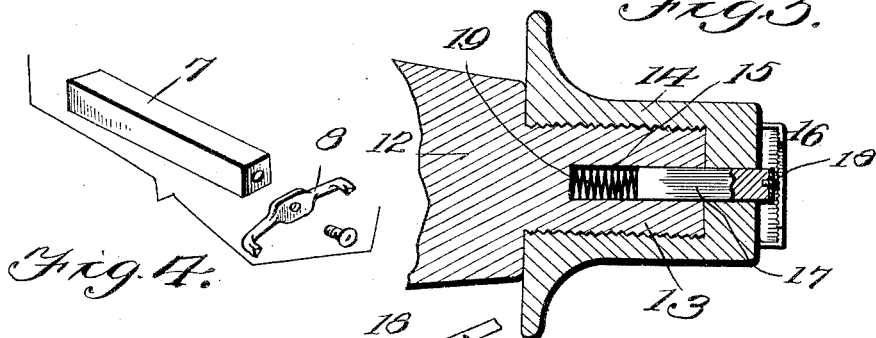
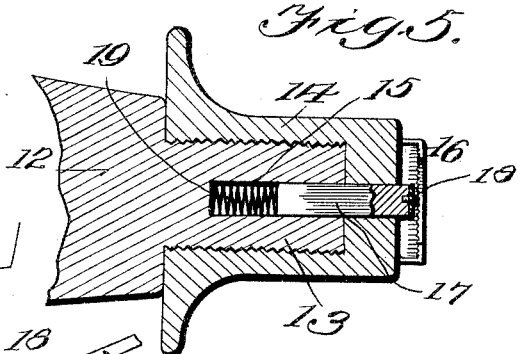

CLARENCE J. STAGER, OF WASHINGTON, DISTRICT OF COLUMBIA.

AXLE-NUT LOCK.

1,098,646.  Specification of Letters Patent.  Patented June 2, 1914.

Application filed May 4, 1912. Serial No. 695,198.

*To all whom it may concern:*

Be it known that I, CLARENCE J. STAGER, citizen of the United States, residing at Washington, District of Columbia, have invented certain new and useful Improvements in Axle-Nut Locks, of which the following is a specification.

My invention relates to improvements in nut locks for vehicle axles, and the primary object of the invention is to provide simple and efficient means for preventing the nut or cap on the reduced end of the axle from working off and yet permit the easy removal of the nut by intention.

The invention is illustrated in the accompanying drawings wherein:

Figure 1 is a view partly sectional of a portion of a wagon axle and nut provided with my nut locking device. Fig. 2 is a front view of the construction shown in Fig. 1. Fig. 3 is a side elevation of the construction shown in Fig. 1. Fig. 4 is a detail view enlarged of the pin, and the pivoted cross piece. Fig. 5 is a longitudinal sectional view showing a modified form of my invention. Fig. 6 is a perspective detail view of the cross piece used with the pin shown in Fig. 5.

Corresponding and like parts are referred to in the following description and indicated in all the views of the accompanying drawings by the same reference characters.

Referring to the drawings, 2 designates the axle or spindle of a vehicle. This is reduced at its extremity as at 3, this reduced extremity being screw threaded as is usual for engagement with a nut or cap 4, the interior of which is screw threaded. The reduced end of the axle or spindle 2 is formed with a longitudinally extending bore 5 which may be square, triangular, oval or have an irregular form provided that it is not circular in section.

The face of the nut or cap is formed at opposite points with the arcuate flanges or lips 6 which extend around parallel to the periphery of the nut and arch toward the center. The inner faces of these flanges or lips are preferably formed with radiating notches or grooves at spaced intervals.

Receivable within the bore 5 is a pin 7 which conforms to the shape of the bore 5 so as to fit snugly therein. It is obvious that when the pin is inserted in the bore, the pin can not be turned.

Pivoted upon the outer end of the pin is a transversely extending member designated 8 which is preferably resilient and which is of sufficient length to extend beneath the flanges 6 when the member is turned so as to bring the extremities of the member under the flanges. The extremities of the member are adapted to resiliently engage the notches or teeth formed in the inner faces of the flanges, and when so engaged, it will be obvious that the member 8, through its action on the pin 7, will prevent the rotation of the nut. It will be noted that while this member is preferably resilient that a rigid member could be used.

It will be obvious that when it is desired to remove the nut, the extremities of the spring member may be brought out of contact with the flanges and the member rotated until its extremities aline with the spaces between the flanges, whereupon the spring member is disengaged from the flanges 6 and the pin removed, the nut then being allowed to rotate.

In Fig. 5 I show another form of my invention which operates on the same principle as the one first described. In this construction, 12 designates the axle, 13 the reduced end thereof which is screw threaded, 14 the cap, 15 the bore extending into the reduced end of the axle, and 16 the overarching lips or flanges corresponding to the flanges 6. In this form of the invention, the pin 17 is formed with a pivoted cross piece 18 which engages beneath the overarching flanges 16, and this pin is forced outward so as to bring the extremities of the cross piece 18 in engagement with the notches or teeth on the inner faces of the flanges by means of a spring 19 disposed in the inner end of the bore. It will be obvious that in this construction in order to remove the nut, it is only necessary to press inwardly upon the cross piece which will press inwardly upon the pin 17 against the force of the spring 19, thus releasing the extremities of the cross piece from their engagement with the lips whereby the pin may be removed.

It will be seen that my invention is extremely simple, that there are no complicated parts to get out of order, and that at the same time it may be made ornamental. The nut or cap is positively held from any rotation while the pin is in place, and yet at the same time may be easily removed when desired.

It will be noted that in both forms of my invention, the extremities of the cross piece are resiliently forced against the inner faces of the arcuate flanges, in one instance by the resilience of the cross piece itself or the extremities thereof, and in the other instance by the spring 19. Of course I do not wish to limit myself to notching the inner faces of the arcuate flanges as in some cases the frictional engagement between the extremities of the cross piece and the inner faces of these arcuate flanges would be sufficient to hold the nuts securely in place.

What I claim is:

The combination with a member having a reduced screw threaded extremity formed with a longitudinally extending many-sided bore, of a nut formed with a bore of the same cross sectional design as the bore of the screw threaded extremity, the nut engaging the extremity and having upon its face arcuately disposed members supported in spaced relation with respect to the nut, the terminals of said arcuate members being in spaced relation and forming diametrically opposed openings, the inner faces of said members being notched and a pin fitting the bore of the member and the nut, a resilient transversely extending crosspiece carried by said pin, the extremity of the crosspiece extending beneath the members and engaging with the notches of said members.

In testimony whereof I affix my signature in presence of two witnesses.

CLARENCE J. STAGER. [L. S.]

Witnesses:
J. D. YOAKLEY,
FRIDUS B. WRIGHT.

---

Copies of this patent may be obtained for five cents each, by addressing the "Commissioner of Patents, Washington, D. C."